March 6, 1945.                 H. M. McCOY                 2,370,675
MULTIPLE STAGE MEANS FOR CHANGING PITCH OF AIRCRAFT PROPELLER BLADES
Filed Aug. 10, 1943            2 Sheets-Sheet 1

INVENTOR
HOWARD M. McCOY

March 6, 1945. H. M. McCOY 2,370,675
MULTIPLE STAGE MEANS FOR CHANGING PITCH OF AIRCRAFT PROPELLER BLADES
Filed Aug. 10, 1943 2 Sheets-Sheet 2

INVENTOR
HOWARD M. McCOY
BY

Patented Mar. 6, 1945

2,370,675

UNITED STATES PATENT OFFICE 2,370,675

MULTIPLE STAGE MEANS FOR CHANGING PITCH OF AIRCRAFT PROPELLER BLADES

Howard M. McCoy, Fairfield, Ohio

Application August 10, 1943, Serial No. 498,050

5 Claims. (Cl. 170—163)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to adjustable pitch propellers for aircraft, and particularly to mechanism whereby the blade-pitch may be controlled either automatically or manually over a wide range extending from a full-feathering pitch-angle through the negative pitch range employed in propeller braking.

It is well known that the torque required to change the propeller blade-pitch is of considerable magnitude. When it is required to change the pitch at an extremely fast rate, such as in fast full feathering, involving a large number of degrees of pitch change in a minimum of time, a large pitch-change motor is required. For normal constant speed governing operation, involving only a few degrees of pitch change at a nominally slow rate, only a small motor is required. In normal flight for instance, the necessary changes in pitch-angle are usually so small that they may be made with a power unit of small horsepower by employing a gear train of large speed-reducing capacity between the power unit and the propeller blade. A motor and gear train which will make these corrections in blade pitch-angle against this torque at the low rate of approximately four degrees per second is usually considered satisfactory for making the relatively minor changes in pitch-angle required to maintain constant engine speed during take-off and normal flight maneuvers. However, certain flight maneuvers, particularly in some military aircraft, require a greater rate of pitch change to maintain constant engine speed and to prevent serious overspeeding. These include those maneuvers requiring rapid changes in engine throttle setting, full-feathering to stop a damaged engine and reduce propeller drag, and propeller braking in reverse pitch both in flight and on the earth's surface. A high rate of pitch change having a maximum rate of approximately 40 degrees per second will suffice for these latter conditions.

Since the energy required for making the larger pitch changes in such short periods of time is considerable, the engine itself has often been chosen as the prime source of this energy, but since the execution of large pitch-changes usually occurs only at short, widely spaced intervals, it may be preferable not to take the required energy for effecting the large pitch-changes directly from the engine and thus perhaps aggravate an offspeed condition which it is aiming to correct, as when the engine is underspeeding, but instead to draw from the engine a small amount of energy gradually and store it, electrically or hydraulically, against the time when the larger pitch-changes must be made.

It is, therefore, an object of the invention to provide and drivably connect to the engine, as part of the system, either a small generator or a small pump for respectively charging either an electric battery or a hydraulic accumulator, then making the larger pitch changes by employing the accumulated energy in larger volume, since the demand occurs only at short and considerably spaced-apart intervals.

Another object of this invention is to provide a propeller pitch-change mechanism with power means to change the pitch at a higher or lower rate as required in the particular situation. The power means in this case may conveniently be a single motor having two speed ratings, or it may comprise two motors of different power capacities, each of the two operating through different transmission gearing.

Other objects will be apparent to those skilled in the art as the invention is described in detail and reference is made to the drawings, in which.

Similar numerals refer to similar parts throughout the several views.

Figure 1:
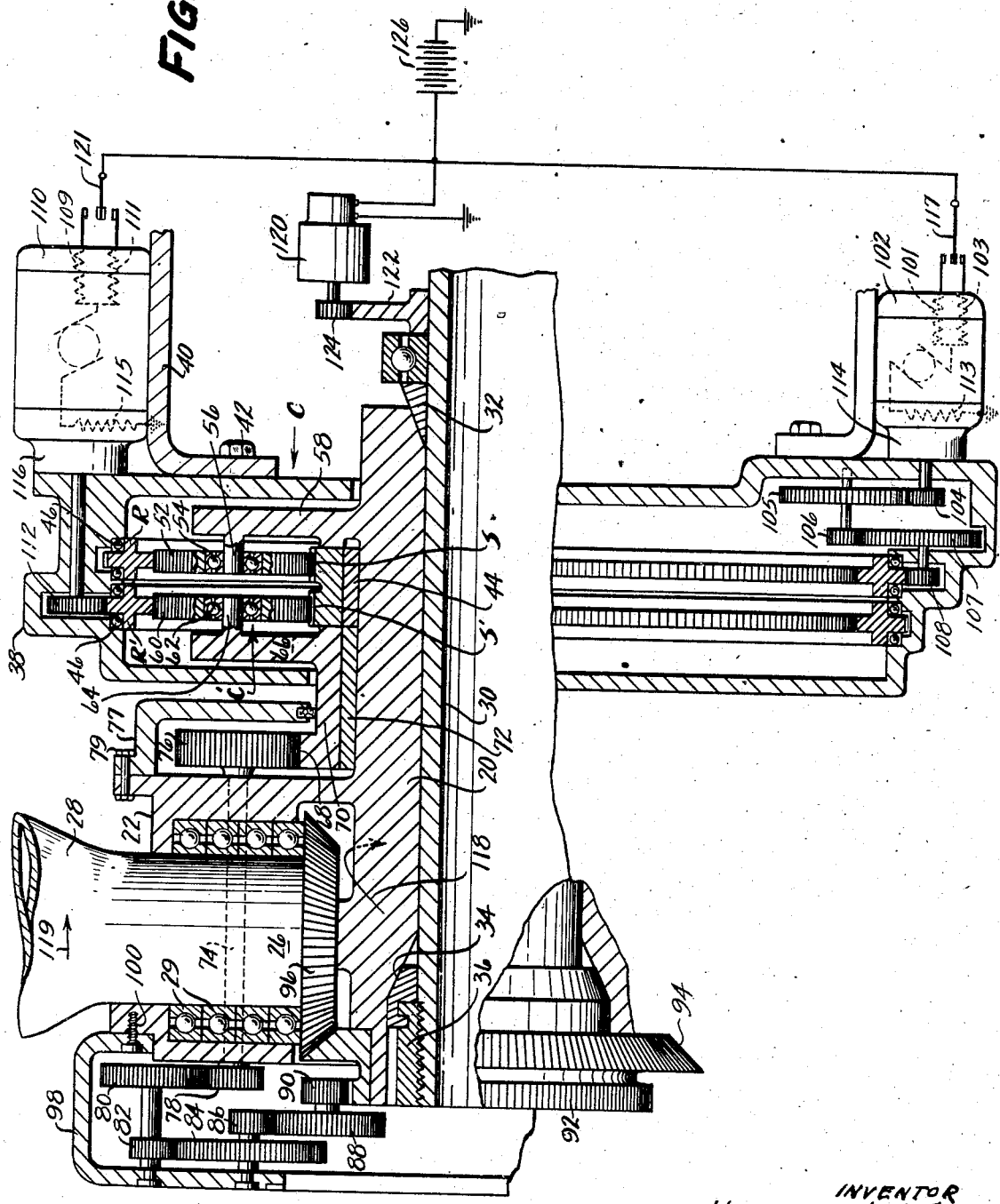
Fig. 1 is a schematic view, partly in section, of a form of the invention in which there is one reversible pitch-change motor for effecting the high rate of pitch change, and another for effecting the low rate of pitch change, each operable alone or both operable together, the motors shown being electric.

In Fig. 1, which is a more or less schematic view of the pitch-change gearing of a controllable pitch propeller, a propeller hub 20 has laterally extending bearing bosses 22 within which antifriction bearings 29 rotatably support the shanks 26 of the propeller blades 28 for rotation about their several axes. The hub 20 is secured to the hollow shaft 30 by cones 32 and 34 and thrust retaining nut 36 in a well-known manner.

At the rear end of the propeller hub 20 a housing 38 is non-rotatably supported on the nose of the engine 40 by screws 42. A pair of ring gears R and R' which have both external and internal teeth are rotatable in antifriction bearings 46. Bearings 46 and ring gears R and R' are concentric with the hub 20, the bearings having their outer races seated in the housing 38.

Two externally toothed sun gears S and S' are provided with a bearing bushing 44 which is freely rotatable on the hub 20. Gears S and S' are shown as being cut from a single piece, although they may be made separately and secured together in any suitable manner for unitary rotation. The numbers of teeth on the two ring gears need not be the same, neither is it required that the sun gears have identical numbers of teeth, but the ratio of the teeth should be R:S::R':S'.

One or more planet pinions 52 are rotatable on bearings 54 carried on studs 56. Studs 56 are shown integral with the flange 58 which is integral with the hub 20, but these several parts may be separately made and rigidly secured together by appropriate means if desired. The studs 56 are so located on the flange 58, with respect to the axis of the propeller hub 20, as to rotatably support the pinions 52 in mesh with both the ring gear R and the sun gear S. The flange 58 with the stud 56 may collectively be referred to as the planet pinion carrier C.

One or more planet pinions 60 are rotatable on bearings 62 mounted on studs 64 carried by flange 66. Flange 66 and an externally toothed gear 68 are integral with a sleeve 70 having a concentric bearing bushing 72 freely rotatable on the hub 20. The sleeve 70 extends from the stationary housing 38 through and into the rotatable propeller hub rear housing 77. The studs 64 are so located on the flange 66, with respect to the axis of the hub 20, as to rotatably support the pinions 60 in mesh with both the ring gear R' and the sun gear S'. The flange 66 with the stud 64 may collectively be referred to as the plant pinion carrier C'.

Rotatably supported in the interstices between adjacent blades 28 in the hub 20 is a shaft 74 to the ends of which are fastened the pinions 76 and 78. Pinion 76 is in constant mesh with the gear 68, the propeller hub rear housing 77, provided for these two gears, being held in place on the propeller hub by the screws 79. Speed-reducing gearing 80, 82, 84, 86, 88, 90, 92 connect the pinion 78 to the bevel gear 94 which is in engagement with the bevel gear 96 fast on the shank 26 of the propeller blade 28, whereby rotation of the shaft 74, in its bearings, will rotate the blade 28 about its own axis. A housing 98 secured to the hub 20 by screws 100 encloses the speed-reducing gearing 80—92.

A small reversible motor 102 mounted on the housing 38 is connected through speed-reducing gearing 104, 105, 106, 107, and 108 to the external teeth of the ring gear R, while a larger reversible motor 110 has its pinion 112 meshing directly in the external teeth of the ring gear R'. Motors 102 and 110 are provided respectively with brakes 114 and 116. These brakes are spring engaged so as to hold the motor rotors nonrotative, but each brake is provided with a disengaging solenoid, the coil of which is in series with its motor winding, so that a brake becomes disengaged simultaneously with the application in either direction of an electric current to its motor and engaged instantly the current is broken.

In the wiring diagram of Fig. 1, the solenoid coils 113 and 115 are provided respectively, to disengage the brakes 114 and 116, the motor 102 being provided with field coils 101 and 103, while the motor 110 has similar coils 109 and 111. The two field coils of each motor are of opposite polarity, whereby reversals of the motors 102 and 110 are respectively obtained through the double-throw switches 117 and 121. A generator 120, engine-driven through the gears 122 and 124, is provided for maintaining a battery 126 in charged condition.

The operation of the mechanism of Fig. 1 is as follows:

As long as no current is supplied to either motor 102 or 110, the ring gears R and R' will remain nonrotative. If the hub 20 and its carrier C are now turned through, for example, one hundred revolutions, the carrier C will drive the sun gear S through $$100\frac{R+S}{S}\text{revolutions}$$

the numerical value of R and S in the equation being the numbers of teeth on the ring gear R and sun gear S, respectively. The sun gear S' must then also rotate $$100\frac{R+S}{S}\text{revolutions}$$

and since the sun gear S' is now the driver, and the ring gear R' is stationary, the carrier C' will be rotated $$\frac{S'}{R'+S'}$$

for each revolution of the sun gear S'. Since the sun gear S' has rotated $$100\frac{R+S}{S}\text{revolutions}$$

the carrier C' will rotate $$100\frac{R+S}{S}\times\frac{S'}{R'+S'}=100\text{ revolutions}$$

As long, therefore, as both ring gears remain nonrotative, irrespective of the speed of the hub 20, each revolution of the hub and its carrier C will rotate the gear 68 one revolution, whereby the gear 68 and the hub 20 rotate as one, and the speed-reducing gearing 76—92 does not turn with respect to the hub, and there is therefore no change in the pitch of the blade 28.

If, however, either ring gear rotates while the other is stationary, the carrier C' will gain or lose revolutions with respect to propeller revolutions, and the amount of gain or loss of carrier C' over propeller revolutions per turn of R or R' will be $$\frac{R}{R+S}$$

wherein R and S represent the number of teeth in ring gear R and sun gear S respectively. The amount of gain or loss depends on the revolutions of R or R' irrespective of whether the propeller is rotating fast or slow or not at all.

If R' is nonrotative and R rotates one turn in the direction of propeller rotation, C' will lose $$\frac{R}{R+S}\text{revolutions over }C$$

If R' is nonrotative and R rotates one turn in the direction of propeller rotation, C' will gain $$\frac{R}{R+S}\text{revolutions over }C$$

If R is nonrotative, and R' rotates one turn in the direction of propeller rotation, C' will gain $$\frac{R}{R+S}\text{revolutions over }C$$

and,

If R is nonrotative, and R' rotates one turn in the direction opposite to propeller rotation, C' will lose $$\frac{R}{R+S} \text{revolutions over } C$$

It is noted that propellerwise rotation of one of the ring gears causes rotative gain of C' over C, while propellerwise rotation of the other of the ring gears causes rotative loss of C' over C.

The problem of determining the gain or loss of revolutions of C' over C per turn of R or R', is seen to be relatively simple. So also when both R and R' are revolved simultaneously and at different speeds, the problem is but little more difficult.

For example, if the ring gear R rotates $n$ turns antipropellerwise during a period in which the ring gear R' rotates N turns propellerwise, then in this period, C' will gain $$(n+N)\left(\frac{R}{R+S}\right) \text{turns over } C$$

Reversal of both motors, thus reversing R and R' from the directions of rotation above specified, will cause C' to lose an equal number of turns over C.

It is noted that, in the above example, the efforts of the two motors are additive. If both R and R' are rotated in the same direction, the efforts of the two motors will be subtractive. In practice, however, it is usually preferable to add the effort of the small motor 102 to that of the larger motor 110 whenever the larger motor is made operative. The speed-reducing gearing 76—92 is such that gain in rotations of the carrier C' over C will rotate the blade 28 in the direction of the arrow 119. Propeller hub rotation is preferably in the direction of the arrow 118.

Figure 2:
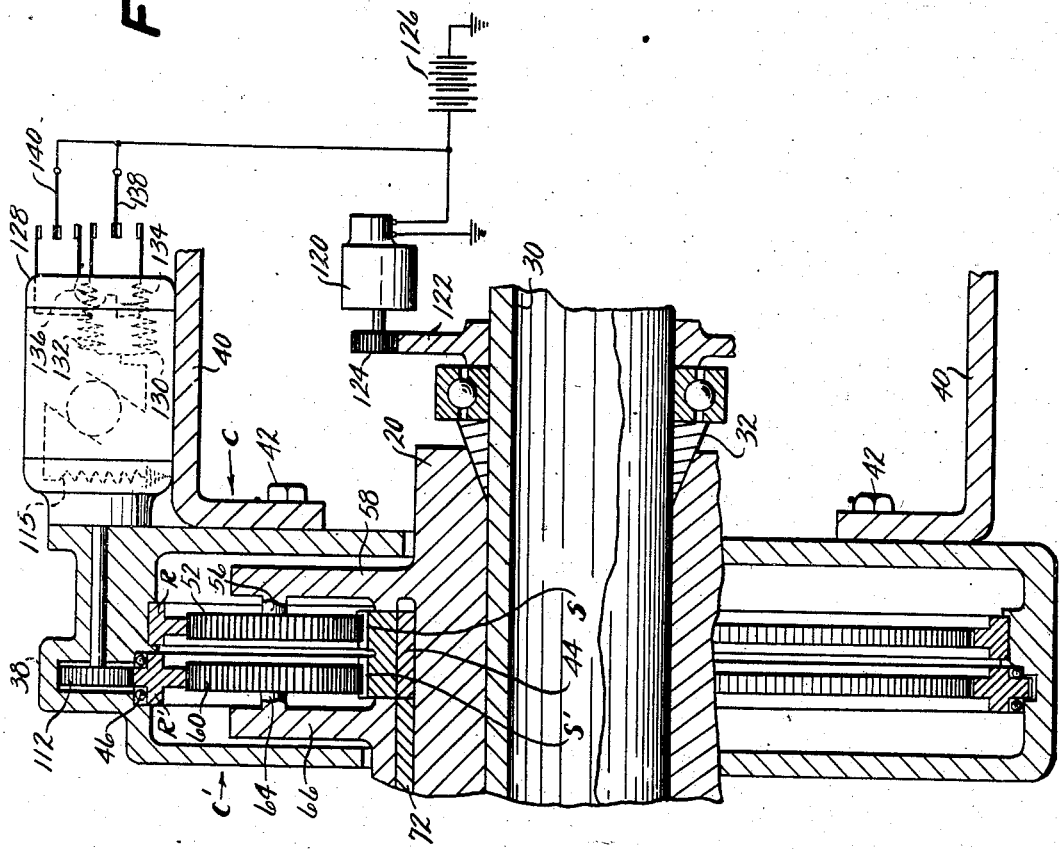
Fig. 2 is a view of the same pitch-change gearing as is shown in Fig. 1, but with the gearing arranged for operation with a single two-speed reversible motor.

In the modification Fig. 2, the construction is substantially the same as shown in Fig. 1 except that the smaller motor 102 and its speed-reducing gearing 104—108 are omitted. Since there is then no means of holding the ring gear R against rotation, the antifriction bearing 46, which rotatably supports the ring gear R in Fig. 1, is removed, and the ring gear R is nonrotatably held in the housing 38 by a pressfit or other suitable means.

For the reversible one-speed motor 110 of Fig. 1, there is then substituted a reversible two-speed motor 128. Motor 128 may be provided with four field windings, coils 130 and 132 having few turns of coarse wire, while coils 134 and 136 have more turns of fine wire. The coils are connected in series-parallel as shown. A double-throw switch 138 is operable downwardly for energizing coils 130 and 134 in series for slow rotation in one direction, and operable upwardly for energizing coils 132 and 136 in series for slow rotation in the other direction. Another double-throw switch 140 is operable downwardly for energizing coil 130 for fast rotation in one direction, and operable upwardly for energizing coil 132 for fast operation in other direction.

It will, of course, be understood that rotation of the ring gears R and R', to achieve pitch change, need not necessarily be accomplished electrically; for instance, a pump may be substituted for the generator 120, a hydraulic accumulator for the battery 126, and one-speed or two-speed hydraulic motors for the electric motors 102, 110, or 128, these and many other variants, modifications and equivalents being embraced by the appended claims.

I claim:

1. For use in connection with a variable pitch aircraft propeller which includes a hub, bearing bosses extending laterally from said hub, bearings in said bosses, blades having their shanks rotatably supported in said bearings, and a gear train connected at its driven end to the blade shanks for rotating said blades, the improved pitch-changing gear mechanism which comprises, in combination, a nonrotatable pitch-changing-gear housing, a planet pinion carrier fast on said hub within said housing, a second planet pinion carrier freely rotatable on said hub within said housing and drivably connected to the other end of said gear train, two coaxial axially adjacent sun gears between said carriers freely rotatable on said hub and connected together for unitary rotation, two coaxial axially adjacent ring gears each having both internal and external teeth concentrically positioned with respect to said sun gears and separately rotatable in said housing, a planet pinion on each said carrier, said pinions being rotatable thereon about an axis which is so positioned as to mesh each of said pinions with both a sun gear and the internal teeth of a ring gear, said pinions being revolvable about said sun gears and within said ring gears, an independently rotatable reversible electric motor for each of said ring gears for rotating said ring gears in said housing, one of said reversible electric motors being of relatively larger power capacity than the other, a driving pinion on the larger electric motor in mesh with the external teeth of one of said ring gears, a second driving pinion on the smaller electric motor, a speed reducing gear train drivably connecting the second said driving pinion to the external teeth of the other ring gear, an electric brake for each motor, each brake having a winding in series with its motor winding, operative to disengage the brake whenever the motor is operated, and electric switch means to control said reversible electric motors.

2. For use in connection with a variable pitch aircraft propeller which includes a hub, bearing bosses extending laterally from said hub, bearings supported by said bosses, blades having their shanks rotatably supported by said bearings, and gearing connected at the driven end to the blade shanks for rotating said blades, the improved pitch-changing gear mechanism which comprises, in combination, a nonrotatable pitch-changing-gear housing, a planet pinion carrier fast on said hub within said housing, a second planet pinion carrier freely rotatable on said hub within said housing and drivably connected to the other end of said gearing, two sun gears between said carriers freely rotatably on said hub and connected together for unitary rotation, two ring gears each having both internal and external teeth concentrically positioned with respect to said sun gears and separately rotatable in said housing, a planet pinion on each said carrier, rotatable thereon about an axis positioned to mesh said pinion with both a sun gear and the internal teeth of a ring gear, and revolvable about said sun gear and within said ring gear, and an independently rotatable reversible motor for each ring gear for rotating said ring gear, one said motor being of relatively larger power capacity than the other, a driving pinion on the larger motor in mesh with the external teeth of one of said ring gears, a driving pinion on the smaller motor, a speed reducing gear train connecting the second said driving pinion to the external teeth of the other ring gear, a brake associated with each motor, each operative upon operation of its motor to be disengaged, and means for controlling said motors.

3. For use in connection with a variable pitch aircraft propeller, which includes a hub, bearing bosses extending laterally from said hub, bearings carried by said bosses, blades having their shanks rotatably supported by said bearings, and a power transmitting means connected at its driven end to the blade shanks for rotating said blades, the improved pitch-changing gear mechanism which comprises, in combination, a nonrotatable pitch-changing-gear housing, a planet pinion carrier fast on said hub within said housing, a second planet pinion carrier freely rotatable on said hub within said housing and drivably connected to the other end of said power transmitting means, two sun gears between said carriers freely rotatable on said hub and connected together for unitary rotation, two ring gears each having both internal and external teeth concentrically surrounding said sun gears and separately rotatable in said housing, planet pinions on said carriers, rotatable thereon about an axis positioned to mesh each of said pinions with both a sun gear and the external teeth of a ring gear, and revolvable about said sun gears and within said ring gears, a relatively large motor, a pinion drivably connecting said relatively large motor to the external teeth of one of said ring gears, a relatively small motor, a second pinion on said relatively small motor, a speed reducing gear train connecting the said second pinion to the external teeth of the other said ring gear, and means to control rotation of said motors.

4. For a variable pitch propeller having a hub, bearing means extending laterally from said hub, and blades rotatably supported by said bearing means for changing the blade pitch, the improved pitch-changing mechanism which consists of two coaxially adjacent planetary gear-sets, each comprising a ring gear having both internal and external teeth, a concentric sun gear, and at least one planet pinion, the sun gears being freely rotatable on said hub and connected, one to the other, to rotate as one, and the ring gears being supported to rotate one independently of the other, two planet pinion carriers, one for each gear-set, each adapted to rotatably support a planet pinion in mesh with the internal teeth of a ring gear and a sun gear and to revolve said pinion about the sun gear and within the ring gear, means drivably securing one carrier to the propeller hub, means drivably connecting the other carrier to a propeller blade, and separate means to rotate said ring gears, one being of larger capacity and having a pinion directly connected to the external teeth of one ring gear, and the other of smaller capacity and having a pinion connected to the external teeth of the other ring gear through speed reducing gearing.

5. For a variable pitch propeller having a hub and laterally extending blades rotatably supported by said hub for changing the blade pitch, the improved pitch-changing mechanism which consists of two coaxially adjacent planetary gear-sets, each comprising a sun gear, a cooperating gear concentric with the sun gear, and planet gearing, the sun gears being freely rotatable on said hub and connected, one to the other, to rotate as one, and the cooperating gears being supported to rotate one independently of the other and each having two rows of teeth, two planet gearing carriers, one for each gear-set, each adapted to rotatably support planet gearing in mesh with a sun gear and one of the rows of teeth of a cooperating gear, and to revolve said planet gearing about the axis of said sun gear and cooperating gear, means drivably securing one carrier to the propeller hub, means drivably connecting the other carrier to a propeller blade, a power means of relatively large capacity connected directly to the other row of teeth of one cooperating gear, and a power means of relatively small capacity connected through a speed reducing gear train to the other row of teeth of the other cooperating gear.

HOWARD M. McCOY.